United States Patent
Labrot et al.

(10) Patent No.: US 8,500,192 B2
(45) Date of Patent: Aug. 6, 2013

(54) WHOLE GLASS ROOF FOR A MOTOR VEHICLE

(75) Inventors: Michael Labrot, Aachen (DE); Lothar Schmidt, Aachen (DE); Laurent Tardy, Venette (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 13/145,982

(22) PCT Filed: Mar. 4, 2010

(86) PCT No.: PCT/EP2010/052752
§ 371 (c)(1),
(2), (4) Date: Jul. 22, 2011

(87) PCT Pub. No.: WO2010/100223
PCT Pub. Date: Sep. 10, 2010

(65) Prior Publication Data
US 2011/0272974 A1  Nov. 10, 2011

(30) Foreign Application Priority Data
Mar. 5, 2009 (DE) .......................... 10 2009 011 265

(51) Int. Cl.
*B60J 7/00* (2006.01)
(52) U.S. Cl.
USPC ....................... 296/210; 296/215; 296/216.01
(58) Field of Classification Search
USPC ...................................... 296/210, 215, 216.01
See application file for complete search history.

(56) References Cited

U.S. PATENT DOCUMENTS

| 4,911,496 | A | 3/1990 | Fuerst |
| 5,205,607 | A | 4/1993 | Takeuchi |
| 5,261,722 | A | 11/1993 | Staley et al. |
| 5,309,677 | A | 5/1994 | Kunert et al. |
| 6,129,413 | A | 10/2000 | Klein |
| 2003/0127884 | A1 | 7/2003 | Sawada et al. |
| 2004/0040232 | A1* | 3/2004 | Memari et al. ............... 52/204.5 |
| 2004/0098946 | A1 | 5/2004 | Meerman |
| 2008/0197675 | A1 | 8/2008 | Nolles |
| 2010/0059253 | A1 | 3/2010 | Labrot et al. |
| 2010/0084894 | A1 | 4/2010 | Billy |

FOREIGN PATENT DOCUMENTS

| DE | 3 725 053 | 2/1989 |
| DE | 4033949 | 1/1992 |
| DE | 4323847 | 5/1994 |
| DE | 69323581 | 9/1996 |
| DE | 19702336 | 7/1998 |
| DE | 198 51 366 | 5/1999 |
| DE | 10 2004 029 740 | 2/2006 |

(Continued)

OTHER PUBLICATIONS

International Search Report for PCT/EP2010/052752 filed on Mar. 4, 2010 in the name of Michael Labrot et al.

(Continued)

*Primary Examiner* — Dennis Pedder
(74) *Attorney, Agent, or Firm* — Steinfl & Bruno LLP

(57) ABSTRACT

The invention relates to a glass roof for a motor vehicle essentially forming an entire roof surface between the front and rear vehicle-roof cross members. The glass panel can be connected fixedly to the vehicle body and can have one or several cutout openings fitted with an openable glass pane.

12 Claims, 1 Drawing Sheet

FOREIGN PATENT DOCUMENTS

Figure 1:
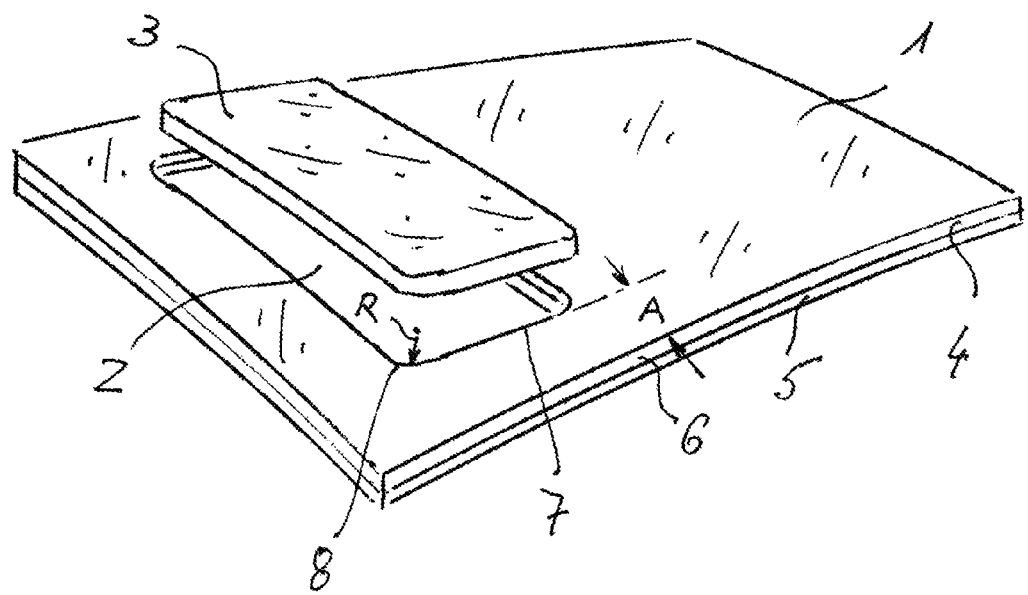

| | | |
|---|---|---|
| EP | 0 306 647 | 3/1989 |
| EP | 0483011 | 4/1992 |
| EP | 0586296 | 9/1994 |
| EP | 0 857 844 | 8/1998 |
| EP | 1905632 | 4/2008 |
| WO | 0207967 | 1/2002 |

OTHER PUBLICATIONS

PCT Written Opinion issued for PCT Application No. PCT/EP2010/052752 filed on Mar. 4, 2010, in the name of Saint-Gobain Glass France (German + English).

* cited by examiner

WHOLE GLASS ROOF FOR A MOTOR VEHICLE

CROSS REFERENCE TO RELATED APPLICATIONS

The present application is the US national stage of International Application PCT/EP2010/052752 filed on Mar. 4, 2010 which, in turn, claims priority to German Patent Application 102009011265.0 filed on Mar. 5, 2009.

The invention relates to a whole glass roof with a ventilation opening for motor vehicles.

In its simplest implementation, a glass roof for motor vehicles consists of window set in a cutout of the roof panel that is mounted displaceably out of a closed position in which it runs flush with the rest of the roof panel into a lowered and retracted position or tiltably around an axis and enables, in an open position, ventilation of the passenger compartment.

However, roof structures for motor vehicles are also known in which the entire roof surface area is made of glass. Thus, in DE 10 2004 029 740 A1, a whole glass roof for a motor vehicle is described that is implemented as a panorama roof and is made of one large glass pane that extends between the front and the rear vehicle roof cross members. In this whole glass roof, the glass pane is connected with a vehicle roof cross member to a roof element that is then fastened as such to the vehicle body. No ventilation opening is provided in the case of this glass roof.

In DE 3 725 053 as well, a glass element covering the entire surface of the roof panel is described. This known glass element is divided into at least two subregions, whose first subregion is the field of vision and in whose second subregion solar cells are arranged. This glass element likewise has no ventilation opening.

Also known are roof structures for motor vehicles in which a large part of the roof panel is made of glass and in which a displaceable ventilation opening is provided. Such roof structures include two or more glass panes each of which extends over the entire width of the roof and which are mounted in lateral longitudinal guide rails. In these, at least one glass pane is usually mounted displaceably in the longitudinal direction of the vehicle relative to a second glass pane and, in the closed position, sealingly abuts the other glass pane. Glass roofs with this basic structure are described, for example, in the documents DE 198 51 366 A1, DE 20 2005 006 879 U1, U.S. Pat. Nos. 5,261,722, 4,911,496, DE 102 55 365 A1, DE 197 02 336 A1, EP 0 306 647 B1.

From the document EP 0 857 844 B1, which describes a window structure for a vehicle side window, it is known to design an opening within a stationary glass pane that can be opened and closed by a glass pane moving back and forth. The stationary glass pane can also form the vehicle roof. Details about the design of the glass pane, when this is intended to serve as a whole glass roof, are not found in this document.

WO 2008/068325 A1 relates to a structure for a whole glass roof, wherein a ventilation opening is likewise provided within a large glass pane to be connected to the roof frame, which opening can be closed and opened by a second glass pane. This document relates to details concerning the mechanical structure for opening and closing the ventilation opening. The large glass pane can have a bend and be made of laminated glass.

The object of the invention is to design, in a whole glass roof comprising a large glass pane having a ventilation opening, the large glass pane to be rigidly connected to the car body such that it meets the high requirements made on a motor vehicle roof with regard to its rigidity and mechanical stability.

The object of the invention is accomplished by a glass roof for a motor vehicle comprising a first glass pane, which is rigidly connected to the body between the front and the rear vehicle roof cross members and has a cutout used as a ventilation opening surrounded on all sides by the glass pane, in which cutout a second, openable glass pane tightly sealing the cutout is mounted, wherein the first glass pane comprises a laminated glass pane made of two individual glass panes each having compressive stresses in their edge areas of at least 8 MPa and the corners of the cutout are rounded with a radius (R) of at least 15 mm, and that [sic] the glass pane has a three-dimensional bend. The expression "three-dimensional bend" refers to geometry deviating from a completely flat pane.

The glass roof according to the invention is distinguished in that the first glass pane consists of a laminated glass pane made of two individual glass panes each having compressive stresses in their edge areas of at least 4 MPa but preferably at least 8 MPa, that the corners of the ventilation opening are rounded with a radius of at least 15 mm but preferably at least 60 mm, and that the glass pane has a three-dimensional bend.

Because of the forces acting on the roof panel, e.g., the wind forces at relatively high driving speeds, and because of the torsional loads that sometimes act on the car body, a whole glass roof for motor vehicles must have high shape stability and torsional rigidity. The use of single-pane safety glass, which would have the necessary strength characteristics, is, however, out of the question for safety reasons, since, in the event of breakage of the pane, the entire roof opening is opened and, moreover, the glass together with the mechanical structure for opening and closing the ventilation window falls into the passenger compartment. A standard laminated glass pane with the dimensions of the motor vehicle roof that has a more or less large ventilation opening is, however, a relatively labile construct and, consequently, is also not suited as such for production of a whole glass roof. Only through the realization of the characteristics according to the invention can a practical whole glass roof be implemented. The bend of the glass pane provides for the required shape stability, while the compressive stresses deliberately incorporated into the edge areas effect the necessary strength and torsional rigidity of the laminated glass pane. And finally, the rounding of the corners in the cutout of the ventilation opening ensures that no high tension peaks that would reduce the stability of the roof as a whole develop in the corners. Normally, the tensile stresses occurring with torsion and wind forces are reduced by a greater bend radius.

The glass roof according to the invention can be prepared together with the necessary mechanism for opening and closing the ventilation window as a complete module and installed relatively quickly in a correspondingly designed vehicle body opening in the same manner as the other glass panes, for example, by gluing to the roof frame using a suitable adhesive bead.

For cutting out the cutout, the conventional cutting processes for production of auto glass panes can readily be used. In this case, it is recommended to perform the cutting process using the high-pressure water jet cutting method, which is also known for cutting glass panes (see, for example, DE 4 033 949 C1). Alternatively, a laser beam cutting process can also be used for this purpose.

THE DRAWINGS DEPICT

FIG. 1 a whole glass roof according to the invention in a perspective view, and

Figure 2:
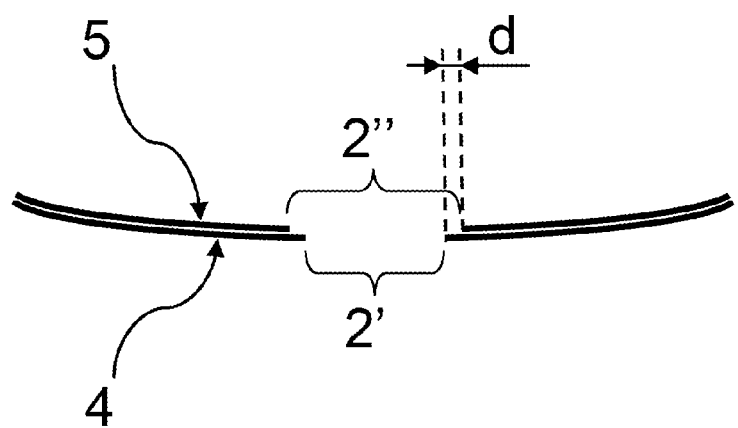

FIG. 2 a variation of the whole glass roof according to the invention in cross-section.

As FIG. 1 depicts, the glass roof comprises a large glass pane 1, that forms the roof panel of the motor vehicle between the front cross member and the rear cross member as well as the lateral longitudinal members of the vehicle roof. The glass pane 1 has, in the front region, a relatively large cutout 2 that forms the ventilation opening in the roof. This cutout 2 can be closed by the glass pane 3. The glass pane 3 and/or the cutout 2 can be provided with suitable frames that enable the opening of the glass pane 3 and ensure the seal of the glass pane 3 in the cutout 2 in the closed state.

FIG. 2 depicts a variation of the glass laminate. The cutout (2") of the inside glass pane (5) is larger than the cutout (2') of the outside glass pane (4). The distance d between the cutout edge of the inside glass pane (5) and the cutout edge of the outside glass pane (4) is peripherally roughly 0 to 10 mm. The edge compressive stresses in the region of the cutout of the inside glass pane (5) and the outside glass pane (4) are elevated.

The glass pane 1 is a laminated glass pane. It comprises the two silicate glass panes 4 and 5 that are joined to each other, for example, by a 0.76-mm-thick intermediate layer 6 made of polyvinyl butyral. The glass panes 4 and 5 each have a thickness of 1.5 to 4 mm, and, preferably, of roughly 2.6 mm. To increase their stability and rigidity, the glass pane 1 is bent both in the longitudinal direction and in the transverse direction. The two glass panes 4 and 5 further have, to further increase their stability in their surface and edge areas, compressive stresses that are generated by accelerated cooling after the bending process. The cooling conditions are to be selected such that, in particular in the edge areas, in which the greatest loads occur, the compressive stresses amount to at least 8 MPa. These edge compressive stresses can be measured with the Sénarmont or Friedel method. A suitable measurement device is, for example, the "Edge Stress Master" of the company SHARPLESS STRESS ENGINEERS LTD.

Before the two glass panes 4 and 5 that later form the laminated glass pane 1 are bent as a pair of panes, the ventilation opening 2 is cut using a high-pressure water jet cutting machine in the two glass panes 4 and 5, and the cut edges are polished in known fashion. In this process, care must be taken that the deviations from the predefined specified dimensions do not exceed +/−1 mm.

The ventilation opening 2 normally has a rectangular shape, but it can also, depending on the configuration of the motor vehicle roof, be designed in any shape, such as trapezoidal, circular, or oval. In any event, care must be taken that the smallest distance A at the narrowest point between the outer edge of the glass pane 1 and the inner edge 7 of the ventilation opening be at least 50 mm, and preferably more than 150 mm.

It has also been demonstrated that the design of the corner regions 8 of the ventilation opening 2 is of substantial significance for the stability of the glass pane 1. It is, consequently, important that the ventilation opening 2 must have no pronounced corners, but rather that the corners 8 must be rounded, with a radius R of at least 15 mm but preferably at least 60 mm. Adequate stability against high loads results, in any case, if the radius R in the corners 8 of the ventilation opening is 80 mm or more.

The glass pane 3 covering the ventilation opening can be a flat glass pane, but it is preferably bent corresponding to the curve of the roof surface area. It can be made of a standard laminated glass pane. However, preferably, it is also made of a laminated glass of individual glass panes having compressive stresses at least in the edge areas and has the same construction as the glass pane 1. Instead of being made of laminated glass, it can also be made from thermally toughened single-pane safety glass or from a transparent impact-resistant polymer, such as polycarbonate. With the glass pane 3 as well, high dimensional precision must be ensured so it fits into the ventilation opening with the most uniformly small clearance possible.

The glass pane 1 is preferably designed as a heat-screening pane with either one or both individual panes of the laminated glass pane being made of a tinted heat-screening glass and/or provided with a heat-ray reflecting coating. Of course, it is expedient in this case to also design the inside glass pane 3 accordingly to give the roof surface area a uniform appearance.

The glass pane 1 is glued to the roof frame during installation in the vehicle body. In order to conceal the adhesive bead, the glass pane 1 is preferably provided peripherally with a, for example, black enamel as is customary with the gluing in of auto glass panes. In addition, the glass pane 1 can be provided on the adhesive surface with a primer coat or already provided with a polymer profile that covers the gap between the edge of the glass pane and the roof frame after installation of the glass pane.

In the case of large dimensions, the glass pane 1 can be provided with suitable stiffening elements that are glued onto the underside of the glass pane. And finally, it is expedient to also provide the glass pane 1, before installation in the vehicle body, with the gaskets and the mechanism necessary for mounting and for opening and closing the glass pane 3. Thus, in particular, a complete glass roof module can be produced that merely has to be inserted into the roof frame.

The invention claimed is:

1. A glass roof for a motor vehicle, comprising:
a laminated glass pane made of two individual glass panes, the two individual glass panes being joined with a glass joining material between the two individual glass panes and layered one with another such that the two individual glass panes contact each other along substantially an entire length of the laminated glass pane, the laminated glass pane being bent in a longitudinal direction and in a transverse direction, thus forming a three-dimensional bend, the laminated glass pane forming substantially an entire roof area between a front and a rear vehicle roof cross members, rigidly connectable to the vehicle body, and the laminated glass pane having a ventilation opening in the laminated glass pane, the ventilation opening being surrounded on all sides by the laminated glass pane; and
an openable glass pane configured to fit in the ventilation opening in the laminated glass pane, thus tightly sealing a cutout in the laminated glass pane,
each of the two individual glass panes having compressive stresses in their edge areas of at least 8 MPa, and
wherein corners of the ventilation opening are rounded with a radius of at least 80 mm.

2. The glass roof according to claim 1, wherein a distance between an outer edge of the laminated glass pane and an inner edge of the ventilation opening is at least 50 mm.

3. The glass roof according to claim 1, wherein the two individual glass panes are an outer glass pane and an inner glass pane, the cutout of the inner glass pane being peripherally 0.1 mm to 10 mm larger than the cutout of the outer glass pane.

4. The glass roof according to claim 1, wherein the openable glass pane sealing the cutout is made of a single-pane safety glass.

5. The glass roof according to claim 1, wherein the openable glass pane sealing the cutout is made of a laminated safety glass.

6. The glass roof according to claim 1, the openable glass pane sealing the cutout is made of an impact-resistant polymer.

7. The glass roof according to claim 1, wherein the openable glass pane sealing the cutout has a three-dimensional bend.

8. The glass roof according to claim 1, wherein the laminated glass pane has an opaque enamel around its edges.

9. The glass roof according to claim 1, wherein the laminated glass pane with the cutout has stiffening elements on its underside.

10. The glass roof according to claim 1, wherein stiffening elements form a mechanism for mounting and operating the openable glass pane.

11. The glass roof according to claim 1, wherein the glass joining material between the two individual glass panes is polyvinyl butyral.

12. The glass roof according to claim 1, wherein the laminated glass pane is a heat-screening pane.

* * * * *

UNITED STATES PATENT AND TRADEMARK OFFICE
CERTIFICATE OF CORRECTION

PATENT NO. : 8,500,192 B2
APPLICATION NO. : 13/145982
DATED : August 6, 2013
INVENTOR(S) : Labrot et al.

It is certified that error appears in the above-identified patent and that said Letters Patent is hereby corrected as shown below:

In the Specification

Column 2, line 14, please delete "that [sic]".

Signed and Sealed this
Seventeenth Day of September, 2013

Teresa Stanek Rea
*Deputy Director of the United States Patent and Trademark Office*